(12) United States Patent
Vetesnik

(10) Patent No.: US 9,506,267 B2
(45) Date of Patent: Nov. 29, 2016

(54) METHOD FOR SUPPORTING AN UPSTANDING MAST

(71) Applicant: Tuffbuilt Products Inc., Winnipeg (CA)

(72) Inventor: Jan Vetesnik, Winnipeg (CA)

(73) Assignee: Tuffbuilt Products Inc., Winnipeg, MB (CA)

( * ) Notice: Subject to any disclaimer, the term of this patent is extended or adjusted under 35 U.S.C. 154(b) by 0 days.

(21) Appl. No.: 14/833,956

(22) Filed: Aug. 24, 2015

(65) Prior Publication Data

US 2015/0361686 A1 Dec. 17, 2015

Related U.S. Application Data

(63) Continuation of application No. 14/481,497, filed on Sep. 9, 2014, now Pat. No. 9,205,288, which is a continuation of application No. 13/717,029, filed on Dec. 17, 2012, now Pat. No. 8,931,749.

(60) Provisional application No. 61/577,150, filed on Dec. 19, 2011.

(51) Int. Cl.
| | |
|---|---|
| *E04H 12/22* | (2006.01) |
| *A62B 35/00* | (2006.01) |
| *F41J 1/10* | (2006.01) |

(Continued)

(52) U.S. Cl.
CPC ....... *E04H 12/2246* (2013.01); *A62B 35/0068* (2013.01); *E04H 12/2269* (2013.01); *F16B 5/0004* (2013.01); *F41J 1/10* (2013.01); *E01F 9/688* (2016.02); *G09F 1/00* (2013.01); *Y10S 248/91* (2013.01); *Y10T 29/49631* (2015.01)

(58) Field of Classification Search
CPC ............. E01F 1/00; E01F 9/00; E01F 9/012; E01F 13/02; G09F 1/00; G09F 17/00; G09F 2001/00; E04H 1/00; E04H 2001/00; E04H 12/22; E04H 12/2246; E04H 12/2269; A62B 35/0068; F41J 1/10
USPC ....... 248/519, 523, 526, 158, 346.06, 346.2, 248/507, 364, 910; 40/607.1, 606.02; 135/16; 405/6, 70, 72; 473/430
See application file for complete search history.

(56) References Cited

U.S. PATENT DOCUMENTS 4,462,599 A * 7/1984 Brown ............... A63B 69/0079
  473/430
5,544,777 A * 8/1996 Watson ................... B65D 1/16
  220/1.5

(Continued)

*Primary Examiner* — Tan Le
(74) *Attorney, Agent, or Firm* — Adrian D. Battison; Ade & Company Inc.

(57) ABSTRACT

A method is provided for supporting an upstanding mast and particularly a davit with a jib where the jib includes a load connecting point arranged such that on application of a load beyond a predetermined limit the spacing of the load connecting point from the mast is reduced to reduce a side load on the base. The method comprises providing a base which includes bottom and side panels connected edge to edge to form a container. The hollow interior is filled by concrete through an opening in one of side panels so that the set solid material substantially fills the hollow interior up to the top and bottom panels and surrounds the sleeve so that the set concrete is in intimate contact with an outer surface of the sleeve and at least part of the inside surfaces of the top and bottom panels. The sleeve which is welded to reinforcing bars passing through the material receives and supports the mast and is held in place by forces contributed both by the set filling material and the panels.

14 Claims, 7 Drawing Sheets

(51) Int. Cl.
  *G09F 1/00* (2006.01)
  *E01F 9/012* (2006.01)
  *F16B 5/00* (2006.01)

(56) References Cited

U.S. PATENT DOCUMENTS

| | | | |
|---|---|---|---|
| 6,889,953 B2 * | 5/2005 | Harbaugh | E04H 12/2246 135/16 |
| 6,978,974 B1 * | 12/2005 | Marasco | A63H 17/12 248/124.1 |
| 8,931,749 B2 * | 1/2015 | Vetesnik | E04H 12/2269 248/346.2 |
| 2005/0189005 A1 * | 9/2005 | Smith | G09F 23/00 135/16 |
| 2008/0224016 A1 * | 9/2008 | Defu | E04H 12/2246 248/523 |
| 2012/0193165 A1 * | 8/2012 | Vetesnik | A62B 35/0068 182/3 |

* cited by examiner

METHOD FOR SUPPORTING AN UPSTANDING MAST

This application is a continuation of application Ser. No. 14/481,497 filed Sep. 9 2014 and now issued as U.S. Pat. No. 9,205,288.

This application is a continuation of application Ser. No. 13/717,029 filed Dec. 17, 2012 and now issued as U.S. Pat. No. 8,931,749.

This application claims the benefit under 35 USC 119(e) of Provisional Application 61/577,150 filed Dec. 19, 2011.

This invention relates to a method for supporting an upstanding mast for example providing a davit with a jib extending to one side and providing a load connecting point for a safety harness.

BACKGROUND OF THE INVENTION

Upstanding or vertical masts are commonly used to provide an upper end of the mast supported from the ground to which items may be attached which apply a horizontal load to the mast tending to topple the mast to one side.

Where a permanent mounting is required, the mast can be inserted into a sleeve which can be connected to the structure of a building or the like by braces or by burying the sleeve in a concrete floor or other structural component.

Portable bases can also be provided which allow the base and the mast carried thereby to be moved to different locations. However these are typically metal in construction with various arms and braces so that the base is complex, massive and difficult to move.

One particular purpose for such masts is that of providing a davit defining a raised location for connection to a cable of a safety harness so that the mast can be located adjacent a place of work of a worker for attachment of the cable so that a fall of the worker from an elevated position will allow the safety harness to take up the fall before the worker reaches the ground. Of course, in order to achieve this, the mast must be closely adjacent the place of work to prevent the worker from swinging toward the mast as he falls. For this purpose preferably the base is portable, that is it is not attached to the building or local structure so that it can be lifted and moved.

An arrangement for supporting a fall restraint cable is shown in U.S. Published Application 2012/0193165 published Aug. 2, 2012 by the present Applicant. This shows a fall restraint system includes a cable for attachment to a fall restraint harness assembly of a worker. The cable can be attached to a boom arm cantilevered on a mast carried from the ground or can be stretched between two points on opposed walls. A shock absorber is provided for absorbing at least part of the shock forces so as to reduce the loading applied to the support system. This comprises an elongate member with a movable member or sleeve mounted on it for longitudinal movement. The movement is resisted by a friction brake or a compressible material contained within a tube so that the sleeve moves along the tube in response to loads exceeding the normal load to reduce the loading on the cable while compressing the material in the tube. The present arrangement is particularly designed from use with the arrangement described in this application but can be used to support masts for other purposes.

SUMMARY OF THE INVENTION

It is one object of the invention to provide a method for supporting an upstanding mast.

According to the invention there is provided a method for supporting an upstanding mast comprising:

assembling a plurality of metal panels including a top panel, a bottom panel and a plurality of side panels to form a container with inside surfaces of the metal panels enclosing a hollow interior;

the top panel having a sleeve attached thereto and extending therefrom generally at right angles to a plane of the top panel downwardly into the hollow interior so that the sleeve extends from the top panel through the hollow interior to the bottom panel;

the sleeve having an open mouth of the sleeve exposed at the top panel arranged to receive and support the mast to hold the mast longitudinally along the sleeve;

turning the container so that one of the side panels which has an opening therein is uppermost;

and filling the hollow interior through the opening in said one of side panels with a settable solid material which is set so that the set solid material substantially fills the hollow interior up to the top and bottom panels and surrounds the sleeve so that the set solid material is in intimate contact with an outer surface of the sleeve and at least part of the inside surfaces of the top and bottom panels whereby the sleeve is held in place by forces contributed both by the set solid material and the top and bottom panels.

Preferably the panels are metal panels although other materials can be used.

Preferably at least some of the panels have upturned edge flanges bolted to edges of next adjacent panels.

Preferably the panels include rectangular side panels and a rectangular bottom panel with the side panels connected at edges of the bottom panel to form a rectangular container. However other shapes such as pyramidical or conical can be used.

Preferably each of the side and bottom panels forms the whole of the respective side. However the sides may be divided into separate panel sections for easier transport prior to the filling of the container. In most cases the container is collapsible for transportation but where transportation is not an issue a complete welded structure may be provided.

Preferably the sleeve is attached to the top panel.

Preferably the top panel is formed in a plurality of pieces with at least one and preferably more of the pieces carrying a sleeve. In this way the top panel can have one or more sleeves attached for one or multiple masts and arranged in a symmetrical manner on the base. Preferably the top panel is formed in three pieces.

Preferably the sleeve is welded into a hole in the top panel so as to extend from the panel at right angles thereto and the sleeve stands slightly proud of the top panel to forma collar into which the mast is inserted.

Preferably the base panel includes base rails.

Preferably there are provided lifting tabs on the panels for lifting of the container including the filling material.

Preferably there is provided on the container and particularly the top panel adjacent the sleeve a mast latch for latching the mast into the sleeve.

Preferably there are provided steel reinforcing bars mounted inside the container and extending through the filler material for steel reinforcement of the concrete. The reinforcing bars can be connected to the panels and/or to the sleeve.

Preferably the mast comprises a davit with a jib extending to one side, although masts for many different purposes can be supported in this manner.

Preferably the jib includes a load connecting point where the load connecting point is arranged such that on application of a load beyond a predetermined limit the spacing of the load connecting point from the mast is reduced to reduce a side load on the base.

Preferably at least one of the reinforcing bars is welded to the sleeve to connect the sleeve to the material.

Preferably there are provided hangers on an inside surface of the sides for supporting the reinforcing bars prior to setting of the material.

Preferably at least a part of one of the sides is open for filling of the container with said one of the sides uppermost.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
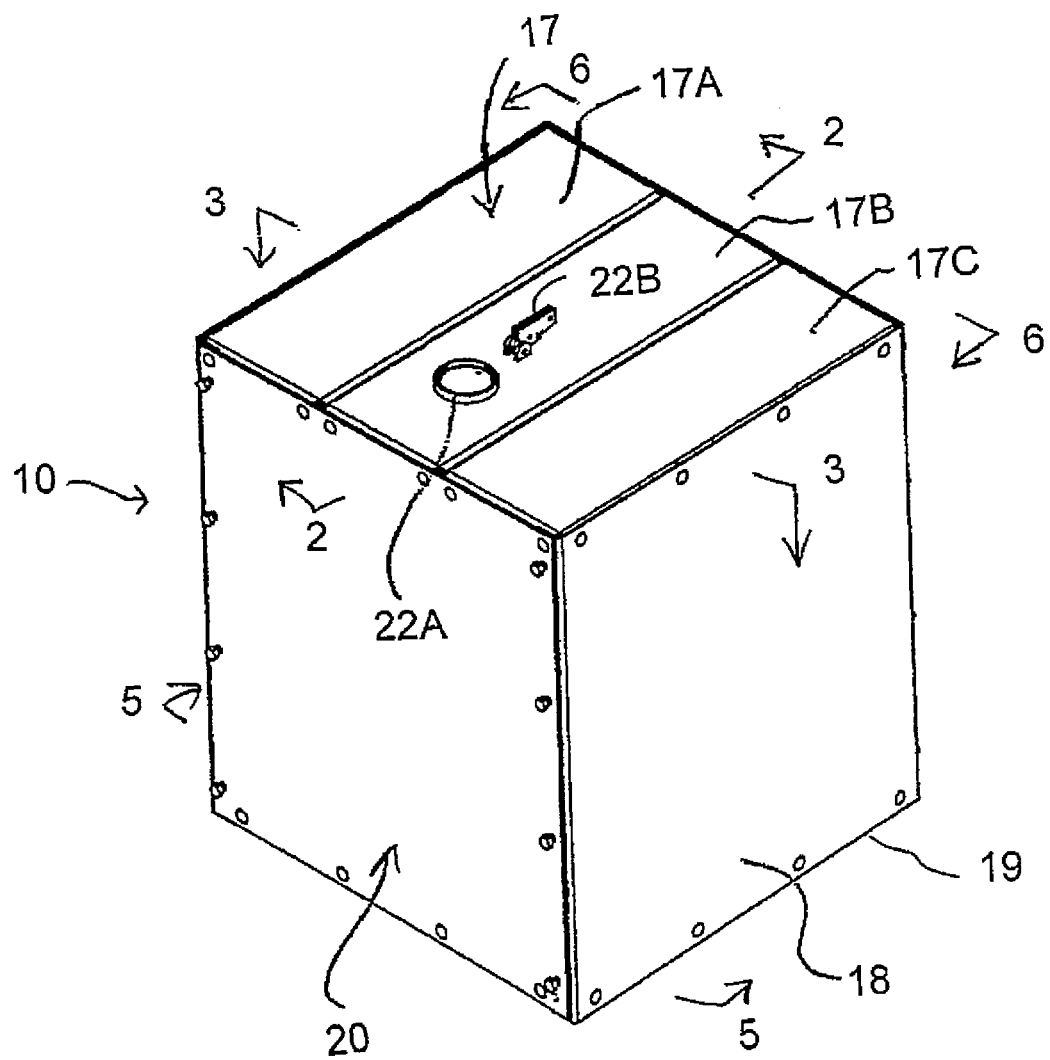
FIG. 1 is an isometric view of a portable base for a mast according to the present invention.

A portable base 10 is provided for supporting an upstanding mast 11 where the mast 11 comprises a davit 12 with a jib 13 extending to one side and the jib 13 includes a load connecting point 14 for connection to a cable and harness 15. The load connecting point 14 is arranged by a coupling schematically indicated at 16 such that, on application of a load beyond a predetermined limit, the spacing of the load connecting point 14 from the mast 11 is reduced to reduce a side load on the base. In this way the structure and mass of the base can be reduced since the load applied to it cannot exceed a predetermined amount.

An example of an arrangement of this type is disclosed in U.S. Published Application 2012/0193165 published Aug. 2, 2012 by the present Applicant, to which reference may be made for further details or which is incorporated herein by reference.

The base 10 is formed of a plurality of metal panels formed from sheet metal including top panel 17, side panels 18 and bottom panel 19 all shaped and arranged such that the panels can be connected edge to edge to form a rectangular container 20 with a hollow interior 21.

Figure 2:
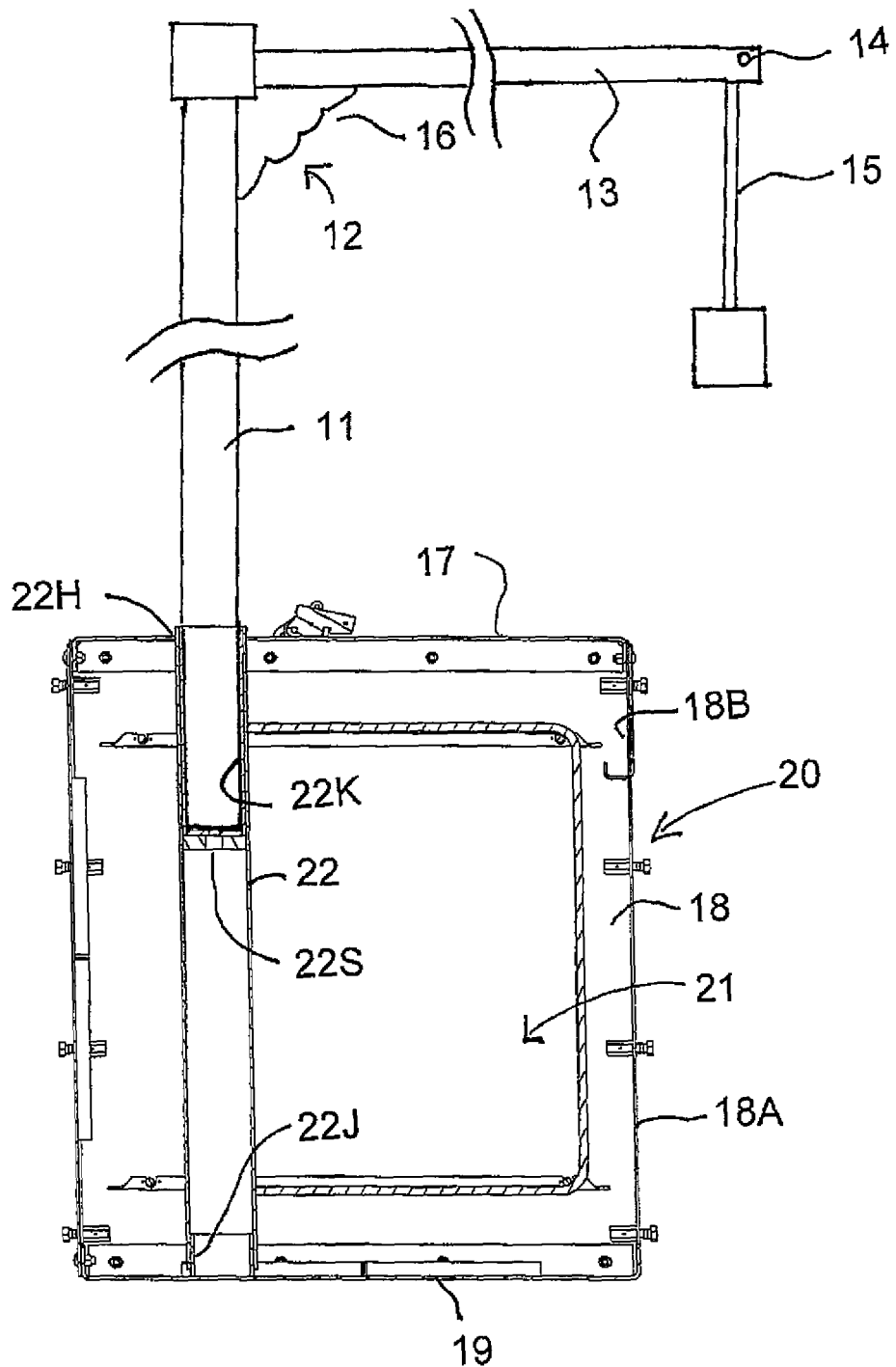
FIG. 2 is a cross-sectional view along the lines 2-2 of FIG. 1 showing the mast mounted on the base.
Figure 3:
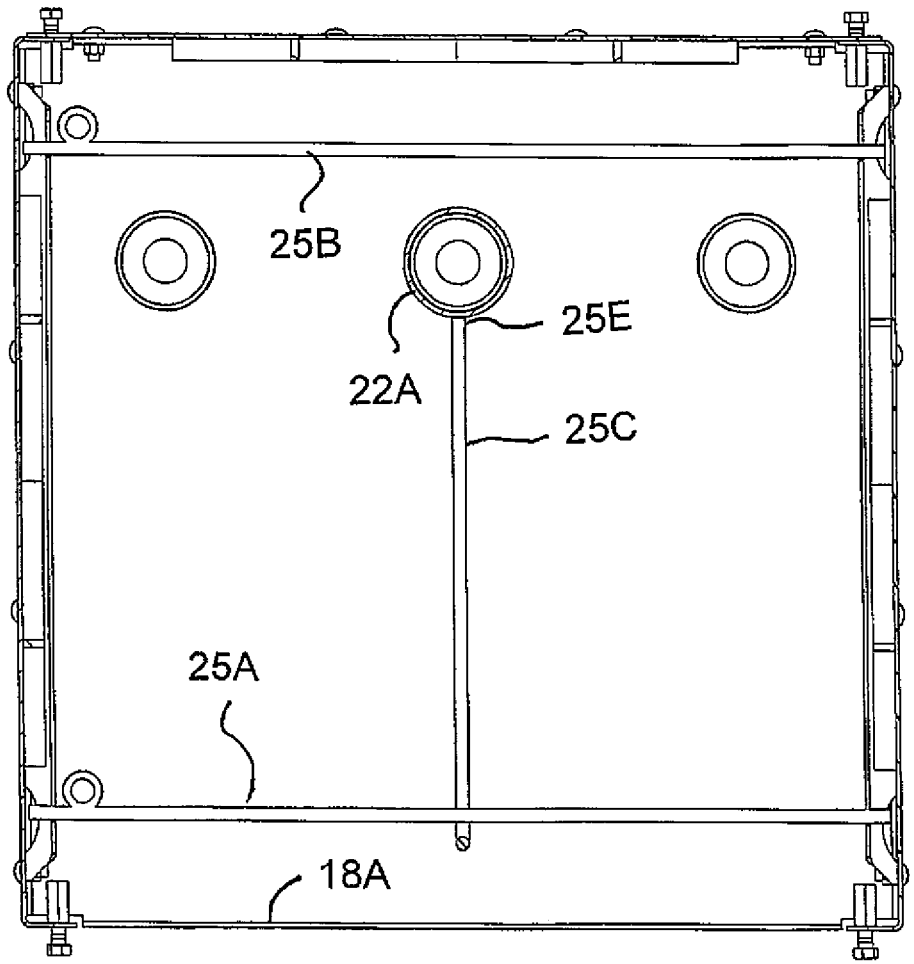
FIG. 3 is a cross-sectional view in the plane 3-3 of FIG. 1.

The top panel 17 has a sleeve 22 attached thereto in that the sleeve passes through a hole 22H and extending therefrom generally at right angles to the horizontal top plane of the panel 17 so that the sleeve extends from the panel 17 at least partly through the hollow interior and preferably to a location at or closely adjacent the bottom panel 19. In some cases it is not fastened to the base but as shown in FIG. 2, the sleeve 22 sits on an insert 22J in the form of a collar welded to the bottom panel 19 and standing upwardly from the panel 19 into engagement with the inside surface or the outside surface of the sleeve to hold it in place aligned with the hole 22H.

The sleeve 22 arranged to receive and support the mast 11 to hold the mast longitudinally along an axis of the sleeve so that both are of the same cross-section to provide a sliding fit and typically both are circular in cross-section. The sleeve 22 has a plastic insert sleeve 22K which sits inside the upper end of the sleeve 22 and acts as a bushing relative to the mast 11. The bushing has an end wall which sits against a bottom stop 22S in the sleeve 22 so as to limit the insertion of the bottom end of the mast into the sleeve 22. The sleeve has a top edge which stands slightly proud of the top panel to form a collar 22A at the top of the bushing into which the mast 11 is inserted.

In the method of the present invention, the panels are assembled to form the container including the hollow interior which receives a filling of a set solid material particularly concrete 23 which fills the hollow interior 21 and surrounds the sleeve. Thus the sleeve 22 is held in place by forces contributed both by the set filling material 23 and the panels 17, 18, 19. In order to fill the hollow interior 21 with the concrete 23, the back of the container shown on the right in FIG. 4 has an opening indicated at 18A so that the back panel is formed only by an upper section 18B which covers only an upper band of the back leaving the remainder of the back as the opening 18A. The upper band 18B has a stiffening flange 18C across the bottom edge of the band. Thus, in the method, the container is assembled with the sleeve in place, tipped onto its front wall and filled from the rear with the concrete material by introducing the concrete through the opening 18A.

Figure 7:
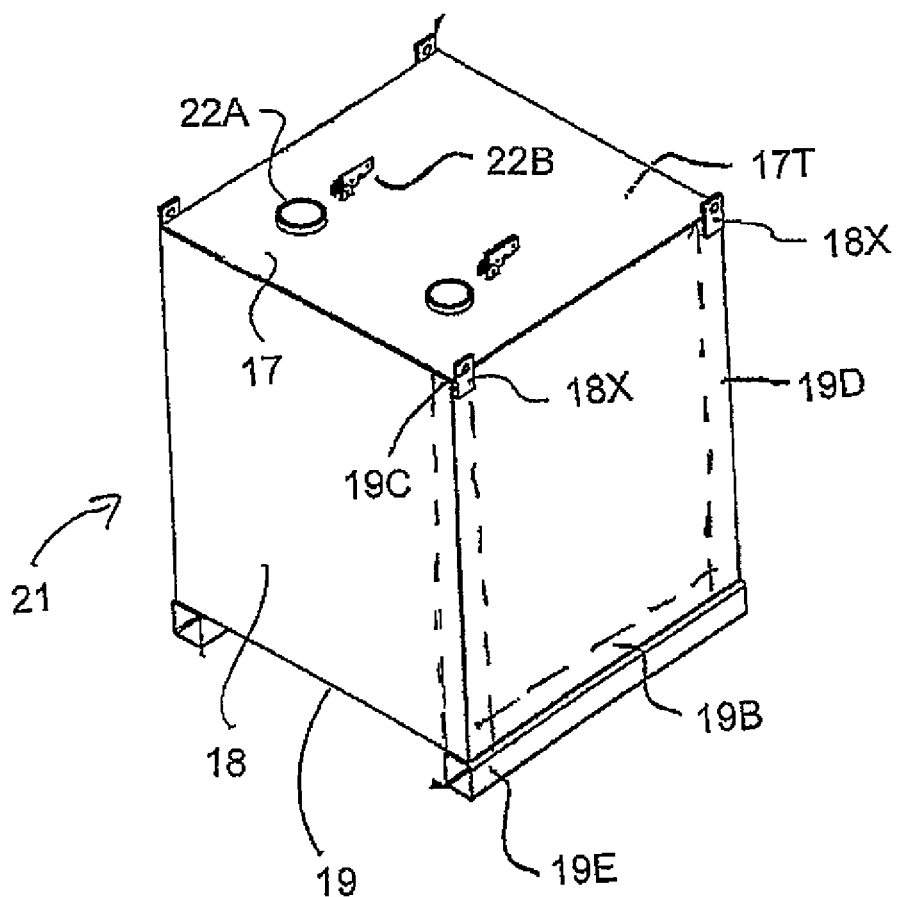
FIG. 7 is an isometric view of a second embodiment of a portable base for a mast according to the present invention.

The panels can be fastened edge to edge to form the container using any suitable connection system. In FIG. 1 at least some of the panels have edge flanges 19A, 19B bolted to edges of next adjacent panels. In FIG. 7, the panels are connected by frame members 19C, 19D along the junction lines.

The panels thus include rectangular side panels 18 and a rectangular bottom panel 19 with the side panels 18 connected at edges of the bottom panel to form a rectangular container. Each of the side and bottom panels covers the whole of the respective side of the container apart from the filling opening at the rear; but panel can be formed of separate pieces. The container can thus be disassembled for transportation in flat pack and assembled at a use location where the filler material is inserted and allowed to set.

The top panel 17 is preferably formed in a plurality of pieces 17A, 17B and 17C with at least one of the pieces 17B or 17A and 17C having a respective hole 22H for carrying the sleeve 22 so that either a central one 17B of the pieces carries a sleeve 22 or the two side pieces 17A and 17C each carry a sleeve 22 so that more than one sleeve 22 is provided as shown in FIG. 7.

On the top panel 17 adjacent the collar 22A is provided a mast latch 22B adjacent the sleeve for latching the mast into the sleeve, which locks the mast in place and/or locks the mast at a selected angle of rotation around the vertical axis of the sleeve.

Figure 4:
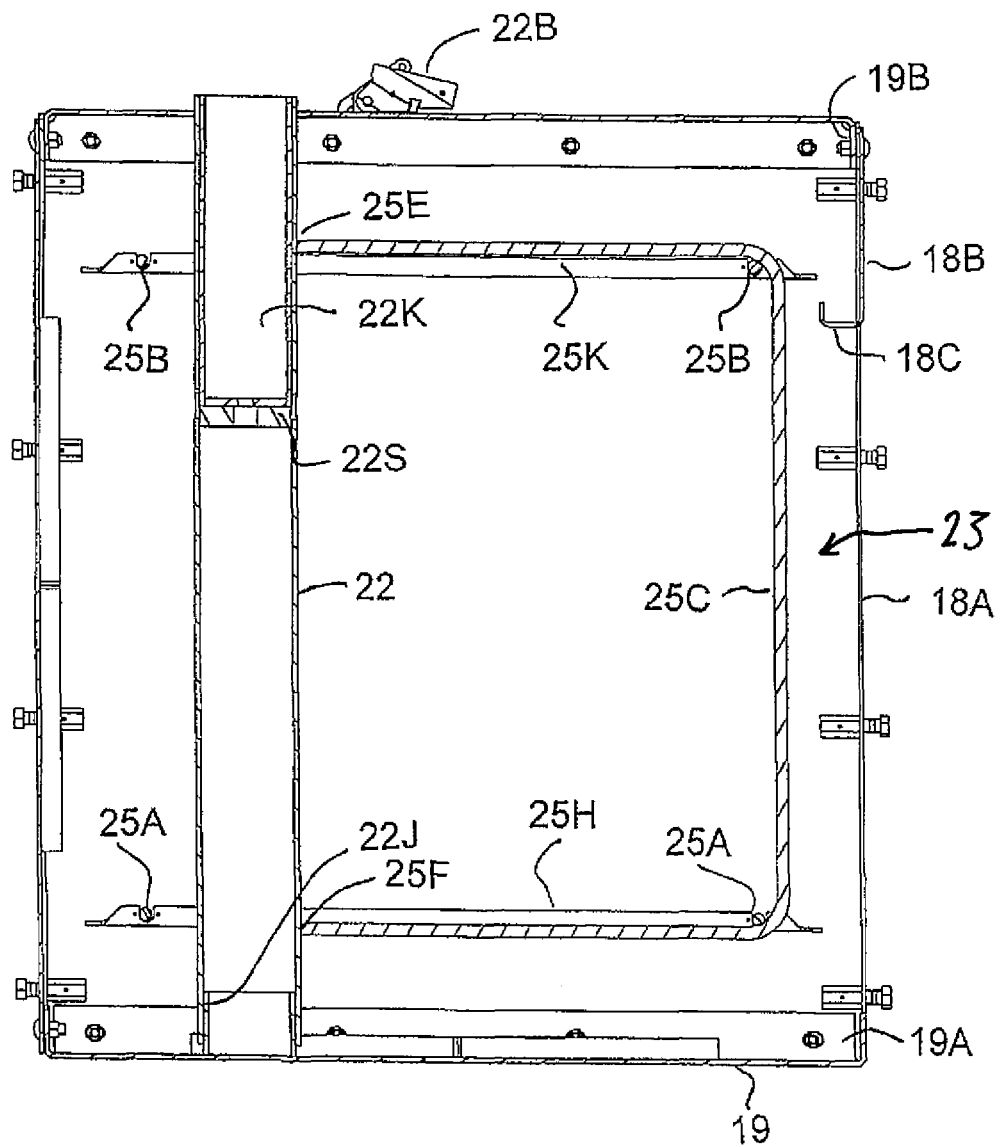
FIG. 4 is a cross-sectional view along the lines 2-2 of FIG. 1.
Figure 5:
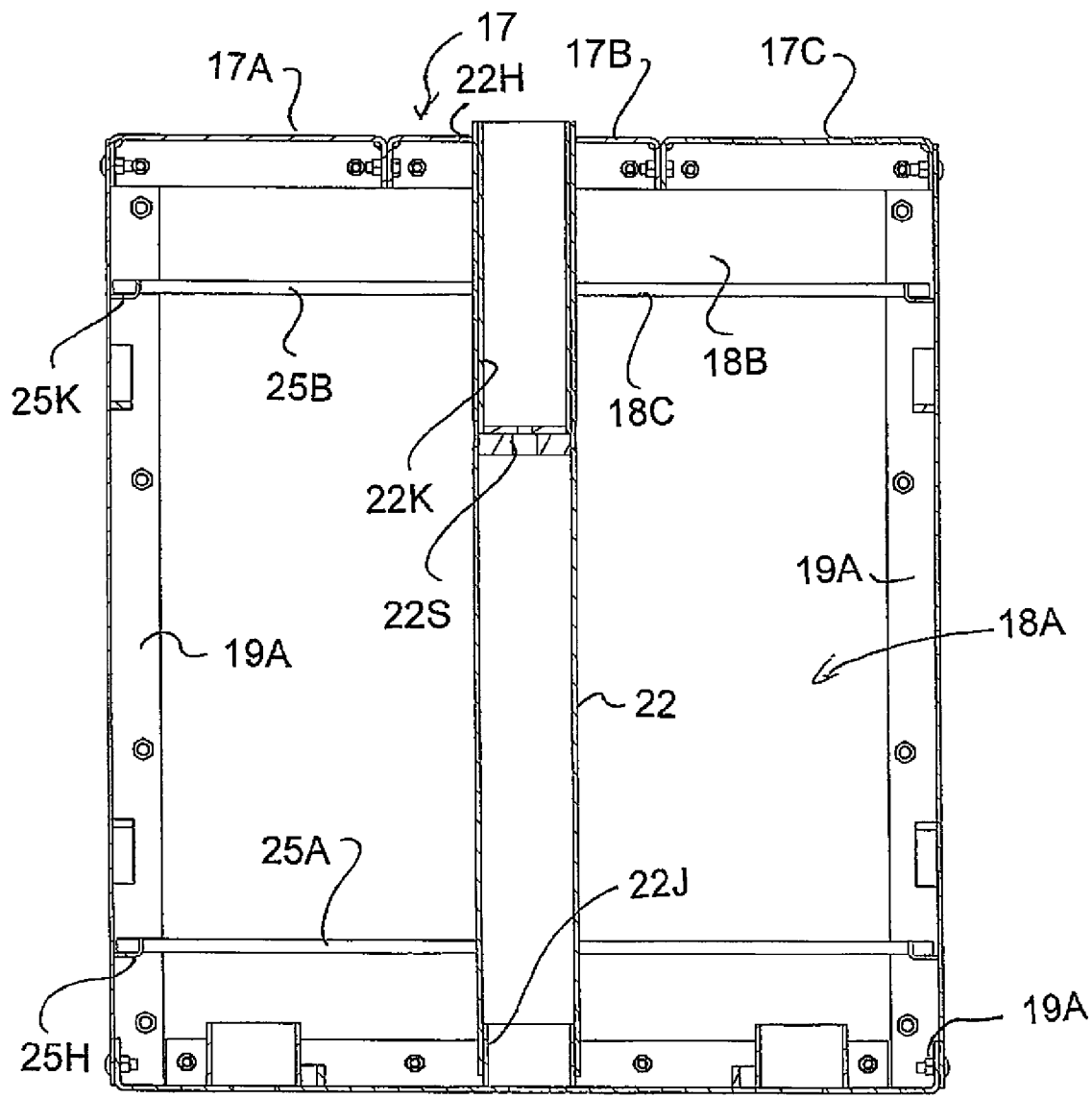
FIG. 5 is a cross-sectional view along the lines 5-5 of FIG. 1.
Figure 6:
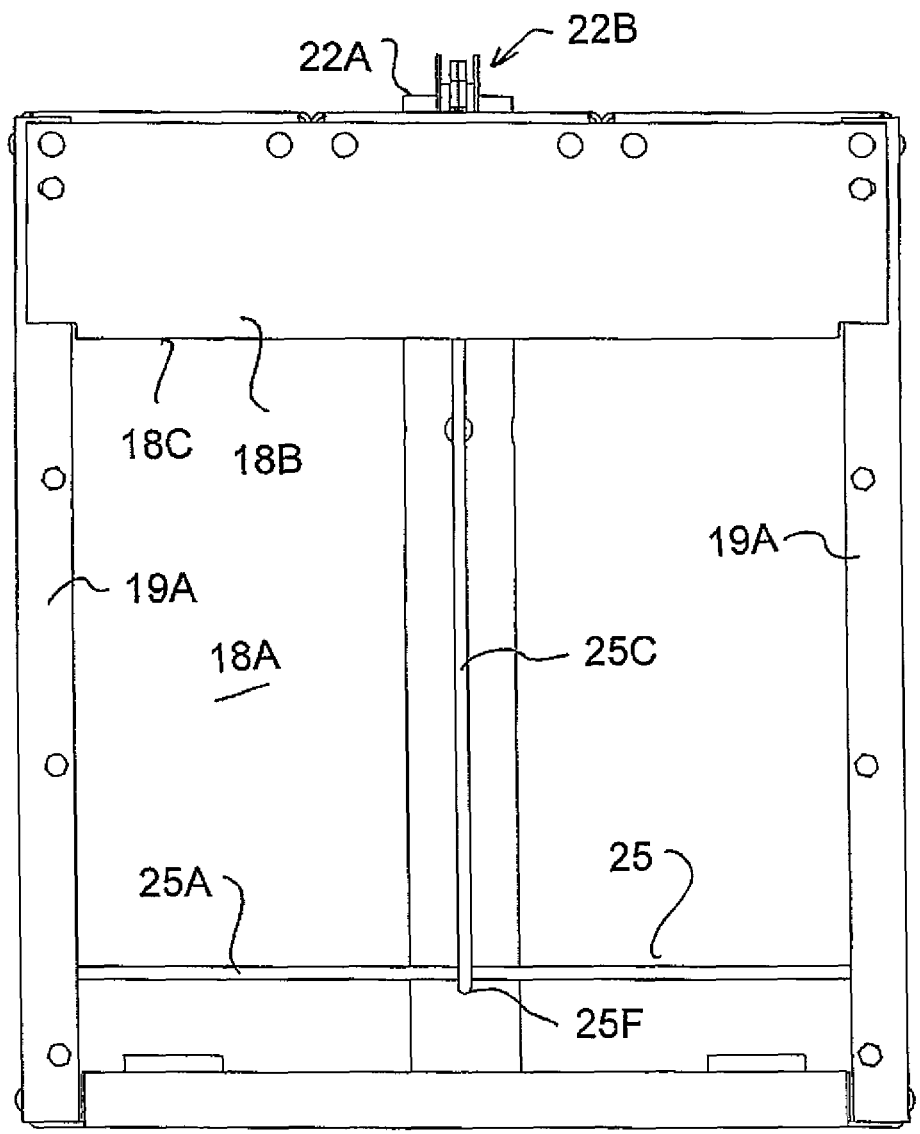
FIG. 6 is a rear elevational view along the lines 6-6 of FIG. 1.

Inside the container is provided reinforcing bars 25 mounted inside the container and extending through the filler material. These are formed of a conventional material and of a conventional arrangement with portions bent at an angle to connect through the concrete to transfer loads as required. The engineering arrangement of the rebars will vary for different constructions. The reinforcing bars may be connected to the panels and/or to the sleeve or may merely be located in the concrete for holding it against tension loads. Thus as shown in FIGS. 4 and 5, the reinforcing bars in one example provides two cross bars 25A and 25B bridging between the side panels and carried on hanger rails 25H adjacent the bottom and 25K adjacent the top. An additional rebar loop 25C is C-shaped and has a vertical leg and two horizontal legs which are welded to the sleeve 22 at ends 25E and 25F. Thus the loop stand in a vertical plane common to the sleeve and the corners of the loop are attached to the cross bars 25A and 25B. In this way loads on the sleeve from the mast are transferred into the concrete by the rebars and by direct engagement of the sleeve surface with the concrete. Yet further the engagement of the sleeve with the top panel 17 and the bottom panel 19 acts to transfer loads into these panels which also are intimately engaged with the concrete. In this way the significant shock loads form the fall restraint when applied to the mast are firstly reduced by allowing the jib 13 to collapse inwardly toward the mast and then the remaining loads are transferred into the sleeve and from the sleeve through the panels and the rebar into the concrete to prevent damage to the structure or toppling of the structure.

As shown in FIG. 7, the top panel 17T is formed as a single panel piece. In this embodiment the construction is formed as a rectangular frame with the panels attached to the outside surfaces of the frame members 19C, 19D. In order to provide additional rigidity, the base panel includes base rails 19E across the base 19. Also in this arrangement there are provided lifting tabs 18X on the panels 18 and presented at the top panel 17T for lifting of the container by a suitable cable system and winch with the container including the filling material as a ballast. In this way the container can be moved to a selected work site to hold the mast at the required location.

The invention claimed is:

1. A method for supporting an upstanding mast comprising:
assembling a plurality of metal panels including a top panel, a bottom panel and a plurality of side panels to form a container with inside surfaces of the metal panels enclosing a hollow interior;
the top panel having a sleeve attached thereto and extending therefrom generally at right angles to a plane of the top panel downwardly into the hollow interior so that the sleeve extends from the top panel through the hollow interior to the bottom panel;
the sleeve having an open mouth of the sleeve exposed at the top panel arranged to receive and support the mast to hold the mast longitudinally along the sleeve;
turning the container so that one of the side panels which has an opening therein is uppermost;
and filling the hollow interior through the opening in said one of side panels with a settable solid material which is set so that the set solid material substantially fills the hollow interior up to the top and bottom panels and surrounds the sleeve so that the set solid material is in intimate contact with an outer surface of the sleeve and at least part of the inside surfaces of the top and bottom panels whereby the sleeve is held in place by forces contributed both by the set solid material and the top and bottom panels.

2. The method according to claim 1 including supplying the panels in disassembled form and releasably fastening edges of each panel to edges of next adjacent panels.

3. The method according to claim 1 including assembling the container from rectangular side panels, a rectangular top panel and a rectangular bottom panel.

4. The method according to claim 1 including forming each of the side panels and the bottom panel as a single integral piece.

5. The method according to claim 1 including connecting the sleeve to both the top panel and the bottom panel.

6. The method according to claim 1 including forming the top panel in a plurality of side by side pieces with one of the pieces attached to the sleeve.

7. The method according to claim 1 including welding the sleeve into a hole in the top panel so as to extend from the panel at right angles thereto.

8. The method according to claim 1 including arranging the sleeve so that the sleeve stands proud of the top panel to form a collar into which the mast is inserted.

9. The method according to claim 1 including attaching the sleeve to the bottom panel by a receptacle carried on the bottom panel against which the sleeve is engaged.

10. The method according to claim 1 wherein the settable solid material is concrete.

11. The method according to claim 1 including providing reinforcing bars inside the container.

12. The method according to claim 11 including welding at least one of the reinforcing bars to the sleeve to connect the sleeve to the material.

13. The method according to claim 11 including providing hangers on an inside surface of the side panels for supporting the reinforcing bars prior to setting of the settable solid material.

14. A method according to claim 1, including providing a boom extending outwardly to one side of the mast having a coupling thereon and attaching a fall restraint harness to the coupling of the boom.

\* \* \* \* \*